(12) United States Patent
Tsukamoto

(10) Patent No.: US 8,815,453 B1
(45) Date of Patent: Aug. 26, 2014

(54) FLAME RETARDANT BATTERY

(75) Inventor: Hisashi Tsukamoto, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 1946 days.

(21) Appl. No.: 11/399,701

(22) Filed: Apr. 5, 2006

Related U.S. Application Data

(63) Continuation-in-part of application No. 11/271,473, filed on Nov. 10, 2005, and a continuation-in-part of application No. 11/272,261, filed on Nov. 10, 2005, now Pat. No. 7,476,468.

(60) Provisional application No. 60/668,878, filed on Apr. 5, 2005.

(51) Int. Cl.
*H01M 6/04* (2006.01)
*H01M 6/16* (2006.01)

(52) U.S. Cl.
USPC ............ 429/326; 429/188; 429/324; 429/338

(58) Field of Classification Search
USPC .................................. 429/188, 324, 326, 338
See application file for complete search history.

(56) References Cited

U.S. PATENT DOCUMENTS

| 5,830,600 | A | * | 11/1998 | Narang et al. | 429/326 |
| 6,022,643 | A | * | 2/2000 | Lee et al. | 429/324 |
| 6,506,524 | B1 | * | 1/2003 | McMillan et al. | 429/324 |
| 2003/0129498 | A1 | * | 7/2003 | Tsukamoto | 429/324 |
| 2006/0188724 | A1 | * | 8/2006 | Moriyama et al. | 428/411.1 |

FOREIGN PATENT DOCUMENTS

WO    WO 2004/074334    * 9/2004

* cited by examiner

*Primary Examiner* — Eugenia Wang
(74) *Attorney, Agent, or Firm* — Gavrilovich, Dodd & Lindsey, LLP

(57) ABSTRACT

The battery has an electrode assembly that includes one or more anodes and one or more cathodes. A first liquid phase is positioned in an active region of the electrode assembly. The first phase includes a first fire retardant and an electrolyte. A second liquid phase is in contact with the first liquid phase. The second liquid phase includes a second fire retardant that is different from the first fire retardant.

12 Claims, 3 Drawing Sheets

FLAME RETARDANT BATTERY

REFERENCE TO RELATED APPLICATIONS

This application is claims the benefit of U.S. Provisional Patent Application Ser. No. 60/668,878, filed on Apr. 5, 2005, entitled "Flame Retardant Battery;" and this application is a continuation-in-part of U.S. patent application Ser. No. 11/271,473, filed on Nov. 10, 2005, entitled "Flame Retardant Battery;" and this application is a continuation-in-part of U.S. patent application Ser. No. 11/272,261, filed on Nov. 10, 2005, entitled "Flame Retardant Battery issued as U.S. Pat. No. 7,476,468 on Jan. 13, 2009; each of which is incorporated herein in its entirety.

TECHNICAL FIELD

This invention relates to batteries and more particularly to batteries having a reduced flammability.

BACKGROUND

The increasing demand for batteries with higher energy densities has resulted in the presence of highly energetic active substances in confined volumes. As a result, large amounts of energy can be released when these batteries short-circuit or otherwise fail. For instance, batteries are known to ignite and catch fire as a result of piercing and/or compression. As a result, there is need for safe batteries that can satisfy the demands for increased energy density.

SUMMARY

A battery is disclosed. The battery has an electrode assembly that includes one or more anodes and one or more cathodes. A first liquid phase is positioned in an active region of the electrode assembly. The first phase includes a first fire retardant and an electrolyte. A second liquid phase is in contact with the first liquid phase. The second liquid phase includes a second fire retardant that is different from the first fire retardant.

Another embodiment of the battery includes an electrode assembly having a separator positioned between one or more anodes and one or more cathodes. A first fire retardant is included in the one or more anodes, the one or more cathodes and/or the separator. A first liquid phase is positioned in an active region of the electrode assembly. The first liquid phase includes an electrolyte. A second liquid phase is in contact with the first liquid phase. The second liquid phase includes a second fire retardant that is different from the first fire retardant.

A method of forming a battery is also disclosed. The method includes positioning an electrode assembly in a battery case. The electrode assembly includes one or more anodes and one or more cathodes. The method also includes positioning a first liquid phase in the battery case. The first liquid phase includes a first fire retardant and an electrolyte. The method also includes positioning a second liquid phase in the battery case. The second liquid phase includes a second fire retardant. The first liquid phase is positioned in an active region of the electrode assembly and is in contact with the second phase. In some instances, the second liquid phase is positioned in the case before the first liquid phase.

The second fire retardant and the first phase can be selected such that the second fire retardant has a low miscibility in the first phase. In some instances, the first phase and the second fire retardant are selected such that the first phase is saturated with the second fire retardant once or before the second fire retardant is 5 wt % of the first phase. Additionally or alternately, the first phase and the second fire retardant can be selected such that the first phase is saturated with the second fire retardant once or before the second fire retardant is at a concentration of 200 ppm in the first phase. In some instances, the second phase consists of the second fire retardant.

The second liquid phase can be excluded from the active region of the electrode assembly. In some instances, the second liquid phase is located substantially outside of the active region of the electrode assembly. Additionally or alternately, at least 90% of the second liquid phase can be located outside of the active region of the electrode assembly.

Suitable first fire retardants include, but are not limited to, phosphazenes including cyclic phosphazenes such as cyclotriphosphazene. The cyclic phosphazenes can be fully or partially halogenated. For instance, the cyclic phosphazenes can be fully or partially fluorinated. Additionally or alternately, the cyclic phosphazenes can have one or more substituents selected from a group consisting of linear or cyclic alkyl groups, alkoxy groups, cycloalkoxy groups, and aryloxy groups. The substituents can be unhaloghenated, fully halogenated or partially halogenated. In some instances, the cyclic phosphazenes are fully substituted with halogens and substituents selected from a group consisting of linear or cyclic alkyl groups, alkoxy groups, cycloalkoxy groups, and aryloxy groups.

Other suitable first fire retardants include the first fire retardants disclosed in U.S. patent application Ser. No. 11/271,473, filed on Nov. 10, 2005, entitled Flame Retardant Battery, and incorporated herein in its entirety. Other suitable first fire retardants include the first fire retardants disclosed in U.S. patent application Ser. No. 11/272,261, filed on Nov. 10, 2005, entitled Flame Retardant Battery, and incorporated herein in its entirety.

Suitable second fire retardants include, but are not limited to, branched alkanes, unbranched alkanes, a cycloalkane, a cycloalkane substituted with one or more alkyl groups, an ether, an amine substituted with one or more alkyl groups, an aliphatic heterocyclic compound, each of which is partially or fully substituted with one or more halogens selected from a group consisting of fluorine, chlorine and bromine. The above components can include substituents other than the specified substituents but are preferably not otherwise substituted. The components are preferably fully halogenated. In some instances, the components are fully fluorinated.

The second fire retardants can be perfluoroalkylamines, perfluorethers, and perfluorocycloalkanes. An example of a preferred perfluoroalkylamines includes a tris(perfluoroalkyl)amine such as tris(perfluoropentyl)amine. The perfluorocycloalkanes can be substituted with one or more alkyl groups or can be otherwise unsubstituted. An example of a preferred perfluorocycloalkane substituted with alkyl groups includes perfluoro-1,3-dimethylcyclohexane.

Other suitable second fire retardants include the second fire retardants disclosed in U.S. patent application Ser. No. 11/271,473, filed on Nov. 10, 2005, entitled Flame Retardant Battery, and incorporated herein in its entirety. Other suitable second fire retardants include the second fire retardants and/or the third fire retardants disclosed in U.S. patent application Ser. No. 11/272,261, filed on Nov. 10, 2005, entitled Flame Retardant Battery, and incorporated herein in its entirety.

The use of the first and second fire retardants permits the electrolyte to employ volatile organic solvents. For instance, the solvent can include one or more organic solvents selected from a group consisting of: tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate (EMC), methyl propyl carbonate, ethyl propyl carbonate, diethyl carbonate (DEC), dipropyl carbonate, propylene carbonate (PC), ethylene carbonate (EC), butylene carbonate, acetonitrile, dimethyl sulfoxide, dimethyl formamide, dimethyl acetamide, γ-valerolactone, y-butyrolactone (GBL), and N-methyl-2-pyrrolidone (NMP).

DETAILED DESCRIPTION

Figure 1A:
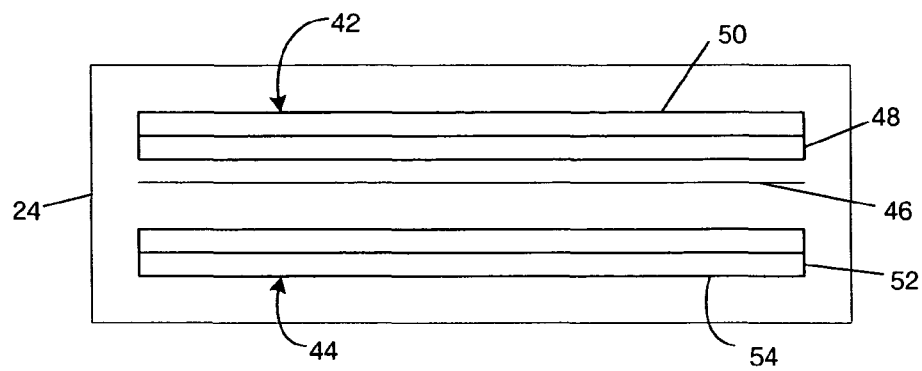
FIG. 1A is a cross section of a battery having an electrode assembly that includes an anode and a cathode.

A battery is disclosed. The battery has an electrode assembly that includes a plurality of electrodes. For instance, the battery can include one or more anodes and one or more cathodes. The battery includes a first liquid phase that includes an electrolyte having one or more salts dissolved in a solvent. The battery also includes a second liquid phase in contact with the first liquid phase but liquid-liquid phase separated from the first phase. The first phase includes a first fire retardant and the second phase includes or consists of a second fire retardant that is different from the first fire retardant.

The electrode assembly includes an active region inside the perimeter of the electrode assembly. The battery energy is generated in the active region by redox reactions at the electrodes accompanied by migration of ions between the electrodes. The first phase can be positioned in the active region of the electrode assembly such that the electrolyte activates the one or more anodes and the one or more cathodes. The second phase can be positioned outside of the active region. This arrangement allows the first fire retardant to be located in the active region of the electrode assembly and the second fire retardant to be positioned outside of the active region of the electrode assembly. The presence of the first fire retardant in the active region of the electrode assembly allows the first fire retardant to suppress heat and/or delay propagation of thermal reactions that occur within the active region. In the event that the battery failure extends beyond the active region, the suppression of the thermal reactions provided by the first fire retardant can be sufficient to enhance the effect of the second fire retardant beyond the effect that the second fire retardant would have by itself. As a result, the first and second fire retardants can act together to enhance the safety of the battery.

The first fire retardant can be more miscible in the electrolyte than the second fire retardant. In some instances, the second fire retardant is substantially immiscible in the electrolyte. As a result, the second fire retardant can be substantially isolated in the second phase. As is noted above, the second phase can be located outside of the active region of the electrode assembly. Substantial isolation of the second fire retardant in a second phase that is located outside of the active region substantially isolates the second fire retardant from the redox reactions at the electrodes. As a result, the second fire retardant can include or consist of one or more compounds that would adversely affect the performance of the battery if exposed to the redox reactions in substantial concentrations. Additionally or alternately, the amount, volume and/or concentration of one or more compounds in the second fire retardant be increased beyond a concentration that would adversely affect the performance of the battery when present in the active region of the electrode assembly. As a result, the amount of second fire retardant present in the battery can be increased to the level that provides the desired level of thermal protection without substantially affecting the performance of the battery.

The elevated level of safety protection provided by the second fire retardant permits the first fire retardant to be used at concentrations that are sufficiently low that they do not reduce battery performance when present in the active region of the electrode assembly. Additionally or alternately, the first fire retardant can be one that does not substantially affect the performance of the battery but is a less effective fire retardant than other first retardants which may adversely performance when present in the active region of the electrode assembly.

The first fire retardant and/or the second fire retardant can be selected so as to have a boiling point or a decomposition temperature greater than 60° C., or 80° C. and/or less than 170° C., or 190° C. at 1 atm. Batteries generally start catastrophic behaviors such as thermal runaway at around 190° C. Employing fire retardant with a boiling point and/or a decomposition point less than 190° C. allows the fire retardant to evaporate and/or break down before the catastrophic behavior occurs. This mechanism can enhance distribution of the fire retardant in the interior of the battery before the catastrophic behavior occurs. The enhanced distribution makes the fire retardant more effective in addressing the failure of the battery. Additionally, a fire retardant should retain its integrity during normal use of the battery. Batteries are generally used at less than 80° C. or less than 60° C. As a result, the integrity of the fire retardant can be retained during normal operation by using fire retardant with a boiling point and/or a decomposition point greater than 60° C. or greater than 80° C. Additionally or alternately, the first fire retardant and/or the second fire retardant can be selected to have a boiling point or a decomposition temperature that is equal to the boiling temperature of the electrolyte+/−30° C. at 1 atm or +/−15° C. at 1 atm. The boiling point of most organic electrolytes is generally around 130° C. As a result, in some instances, the first fire retardant and/or the second fire retardant have a boiling point or a decomposition temperature of 130° C.+/−30° C. at 1 atm or 130° C.+/−15° C. at 1 atm. These conditions can enhance distribution of the fire retardant in the interior of the battery before the catastrophic behavior occurs. For instance, evaporation of a fire retardant and the electrolyte at about the same temperature encourages mixing of the electrolyte and fire retardant vapors. Because mixing these vapors can reduce the electrolyte volatility, these fire retardant conditions can enhance the battery safety.

FIG. 1A is a schematic view of a suitable battery. The battery includes a case 24 that holds an electrode assembly including a cathode 42 and an anode 44. A separator 46 separates the cathode 42 and anode 44. The cathode 42 includes a cathode medium 48 on a cathode substrate 50. The anode 44 includes an anode medium 52 on an anode substrate 54.

Figure 1B:
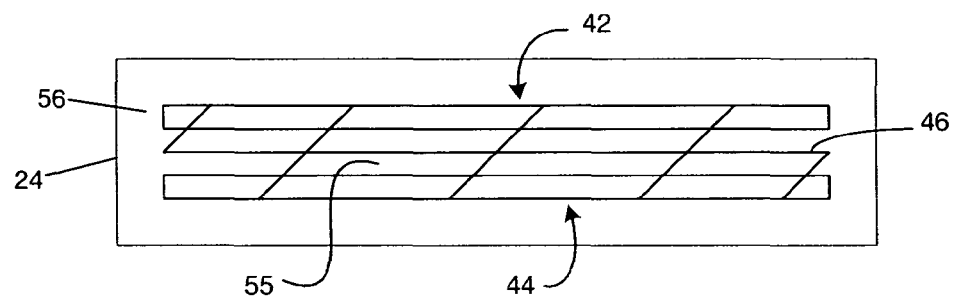
FIG. 1B illustrates the active region of the electrode assembly shown in FIG. 1A.

The electrode assembly of FIG. 1A has an active region illustrated by the slanted lines in FIG. 1B. Energy is generated in the active region by redox reactions at the electrodes accompanied by migration of ions between the electrodes. The active region can be defined by the perimeter of the electrode assembly. Accordingly, the active region generally includes the electrodes and the region between the electrodes through which the ions migrate. As a result, the active region can include all or a portion of the separator and all or a portion of the electrolyte.

Figure 1C:
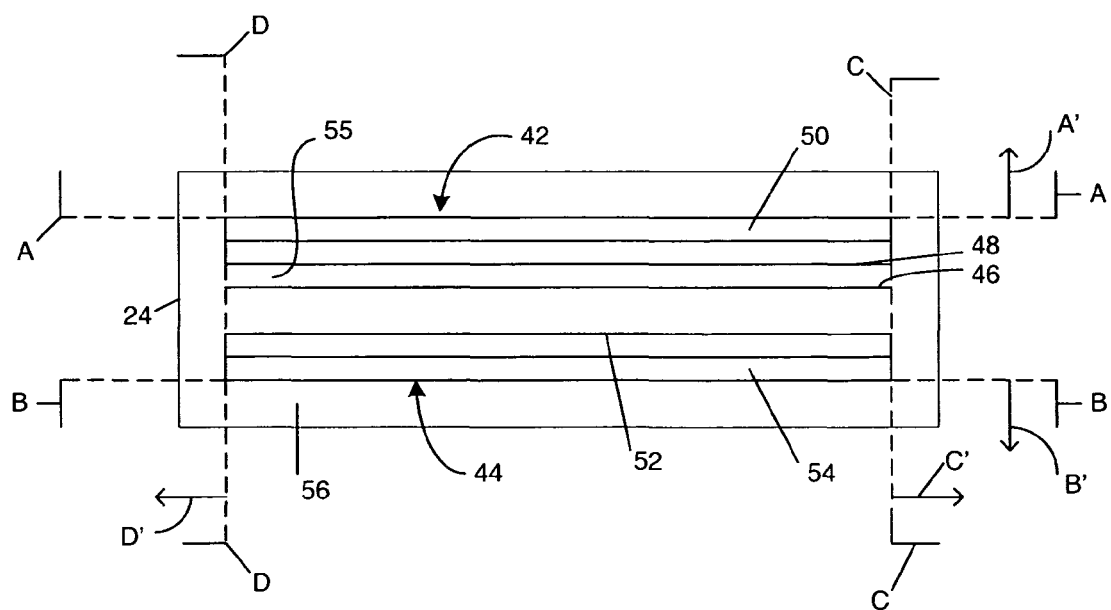
FIG. 1C illustrates possible locations for a first liquid phase relative to a second liquid phase in the battery of FIG. 1A.

A first liquid phase 55 is located in the active region. For instance, the first liquid phase 55 can be located between the electrodes in the electrode assembly. The first liquid phase 55 includes or consists of an electrolyte that activates the anode and the cathode. The electrolyte includes at least one or more salts in a solvent. A second liquid phase 56 is located inside the same compartment of the battery case as the first phase and is in contact with the first phase but is primarily located outside of the active region. For instance, the second phase 56 can be positioned between the electrode assembly and the case. FIG. 1C illustrates possible locations of the second phase in the battery case 24. The second phase 56 can be located above the active region, below the active region, and/or in one or more locations adjacent to the lateral sides of the active region. For instance, the dashed line extending between the brackets labeled A include the upper perimeter of the active region. As is evident from arrow labeled A', the second phase can be positioned at one or more locations at or above the dashed line extending between the brackets labeled A. The dashed line extending between the brackets labeled B include the lower perimeter of the active region. As is evident from the arrow labeled B', the second phase can be positioned at one or more locations at or below the dashed line extending between the brackets labeled B. The dashed line extending between the brackets labeled C include the right perimeter of the active region. As is evident from the arrow labeled C', the second phase can be positioned at one or more locations at or to the right of the dashed line extending between the brackets labeled C. The dashed line extending between the brackets labeled D include the left perimeter of the active region. As is evident from the arrow labeled D', the second phase can be positioned at one or more locations at or to the left of the dashed line extending between the brackets labeled D. In some instances, the second phase 56 is substantially excluded from the active region.

Figure 2A:
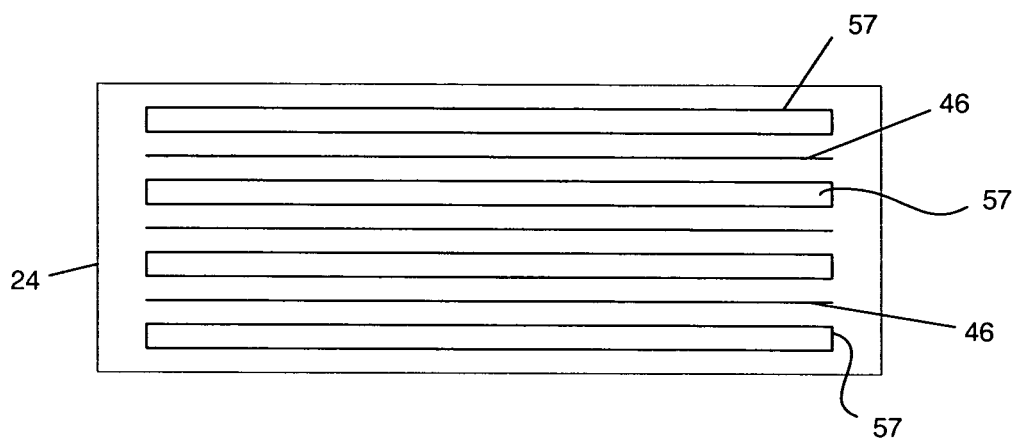
FIG. 2A is a cross section of a battery having an electrode assembly that includes a plurality of anodes and a plurality of cathodes.

FIG. 2A is a cross section of battery having a case 24 that houses an electrode assembly having a stack of electrodes 57. Separators 46 are positioned between adjacent electrodes 57. Electrode stacks generally include anodes alternating with cathodes.

Figure 2B:
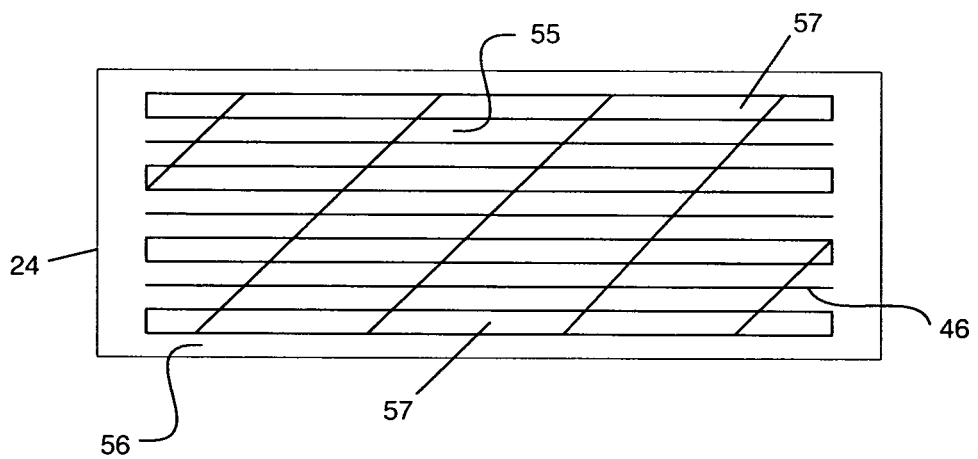
FIG. 2B illustrates the active region of the electrode assembly shown in FIG. 2A.

The active region of the electrode assembly is illustrated by the slanted lines in FIG. 2B. The first phase 55 is positioned in the active region. For instance, the first liquid phase can be located between the electrodes in the electrode assembly. The second phase 56 is positioned outside of the active region. In some instances, the second phase is substantially excluded from the active region.

Figure 3B:
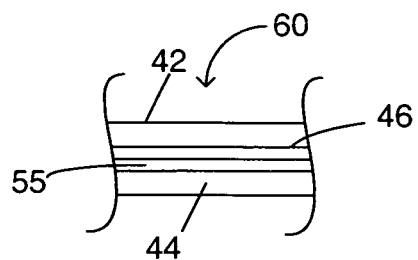
FIG. 3B is a cross section of the electrode assembly shown in FIG. 3A.
Figure 3A:
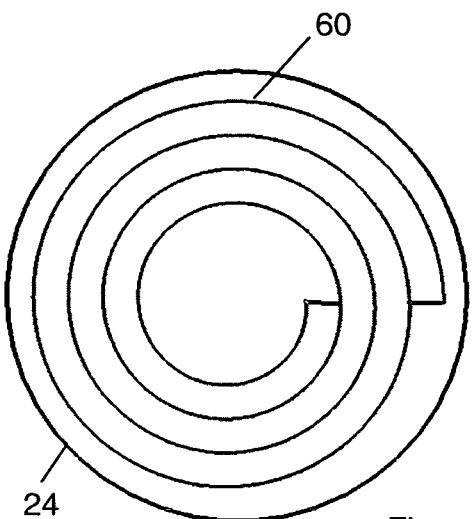
FIG. 3A is a cross section of a battery having a wound electrode assembly.
Figure 3C:
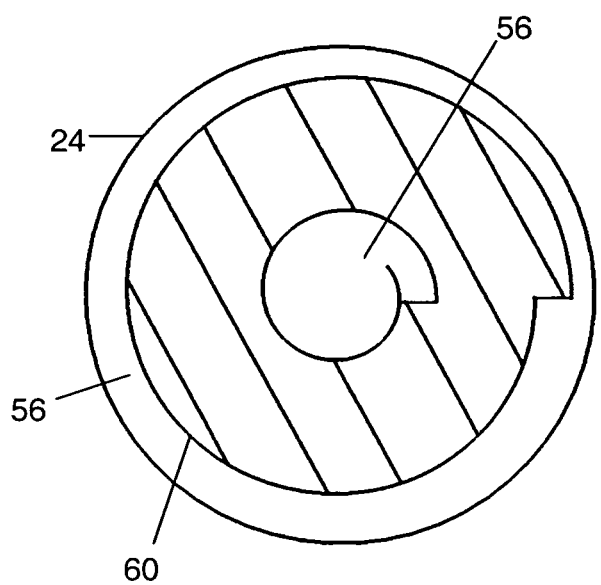
FIG. 3C illustrates the active region of the electrode assembly shown in FIG. 3A.

FIG. 3A through FIG. 3C illustrate a battery having a case 24 that houses an electrode assembly 60. FIG. 3A is a cross section of the battery. The battery includes a wound type electrode assembly 60, which is often called a "jelly roll." FIG. 3B illustrates a section of the electrode assembly 60. The electrode assembly 60 includes a separator 46 positioned between an anode 44 and a cathode 42. The electrode assembly 60 includes an active region illustrated by the slanted lines in FIG. 3C. The first phase 55 is positioned in the active region of the electrode assembly such that the electrolyte included in the first phase activates the electrodes of the electrode assembly. For instance, the first liquid phase can be located between the electrodes in the electrode assembly as illustrated in FIG. 3B. The second phase 56 can be positioned outside of the active region as illustrated in FIG. 3C. For instance, the second phase can be positioned in the center of the wound electrode assembly and/or between the wound electrode assembly and the case. In some instances, the second phase is substantially excluded from the active region.

As is evident from the above illustrations and discussions, the second phase can be positioned in contact with an inactive side of electrodes where low levels of redox reaction and/or low levels of ion intercalation occur during discharge of the battery.

As noted above, the first phase is located in the active region of the electrode assembly. The first phase can be limited to locations in the active region of the electrode assembly. For instance, the first phase can be substantially excluded from the regions outside of the active region. In some instance, the first phase extends outside of the active region. For instance, the first phase can be located in the active region of the electrode assembly and in one or more regions outside the active region of the electrode assembly.

The above description of FIG. 1A through FIG. 3B disclose the second phase as being excluded from the active region. However, in some instances, the effects of surface tension and/or the curvature of a meniscus that can form between the first phase and the second phase can draw portions of the second phase into the active region. As a result, in some instances, more than 85%, more than 90%, or more than 95% of the second phase volume is located outside of the active region of the electrode assembly.

As noted above, the first phase includes or consists of the battery electrolyte. The first fire retardant can be included in the electrolyte. In some instances, the first fire retardant is located in the one or more anodes, and/or the one or more cathodes and/or the separator in addition to being included in the electrolyte and/or as an alternative to being located in the electrolyte. When the first fire retardant is included in the electrolyte, the first fire retardant can have a volume % in the electrolyte, at room temperature of greater than 0.1%, 1%, and/or less than 25%, or 15% and preferably in a range of 3% to 10%, or in a range of 3% to 5%.

The second phase includes or consists of the second fire retardant. The second fire retardant can have a low miscibility in the first phase. Because the first phase is located in the active region of the electrode assembly, this arrangement can help to isolate the second fire retardant to locations outside the active region of the electrode assembly. In some instances, the second fire retardant is substantially immiscible in the first phase. A suitable miscibility of the second fire retardant in the first phase at room temperature includes, a miscibility of less than 10 wt %, less than 5 wt %, or less than 1 wt % where the first phase is saturated with the second fire retardant once or before the specified weight percentage of the second fire retardant in the first phase is reached.

The first fire retardant can be substantially excluded from the second phase or can be present in the second phase. Selecting the composition of the first fire retardant and the second phase such that the first fire retardant has a low miscibility in the second phase can help to isolate the first fire retardant in the first phase. In some instances, the second phase consists of the second fire retardant. As a result, the above miscibility conditions can apply to the miscibility of the first fire retardant in the second fire retardant.

Because the second fire retardant is substantially excluded from the active region of the electrode assembly, the second fire retardant can be present in the battery in larger amounts or concentrations than would be desirable if the second fire retardant were substantially present in the active region.

Suitable first fire retardants include, but are not limited to, phosphazenes including cyclic phosphazenes such as cyclotriphosphazene. The cyclic phosphazenes can be fully or partially halogenated. For instance, the cyclic phosphazenes can be fully or partially fluorinated. Additionally or alternately, the cyclic phosphazenes can have one or more substituents selected from a group consisting of linear or cyclic alkyl groups, alkoxy groups, cycloalkoxy groups, and aryloxy groups. The substituents can be unhalogenated, fully halogenated or partially halogenated. In some instances, the cyclic phosphazenes are fully substituted with halogens and substituents selected from a group consisting of linear or cyclic alkyl groups, alkoxy groups, cycloalkoxy groups, and aryloxy groups.

A suitable cyclic phosphazene for use as the first fire retardant includes a cyclotriphosphazene. An example of a cyclotriphosphazene that is fully substituted with fluorines and a single alkoxy substituent is represented by

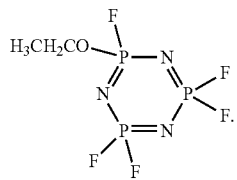

An example of a cyclotriphosphazene that is fully substituted with fluorines and a plurality of alkoxy substituents is represented by

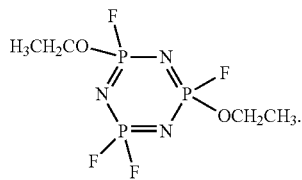

An example of a cyclotriphosphazene that is fully substituted with fluorines and an aryloxy substituent is represented by

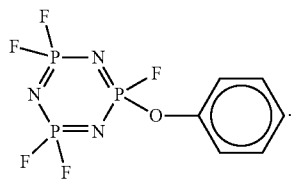

Suitable second fire retardants include branched alkanes, unbranched alkanes, a cycloalkane, a cycloalkane substituted with one or more alkyl groups, an ether, an amine substituted with one or more alkyl groups, an aliphatic heterocyclic compound, each of which is partially or fully substituted with one or more halogens selected from a group consisting of fluorine, chlorine and bromine. The above components can include substituents other than the specified substituents but are preferably not otherwise substituted. In some instances, the thermal suppression provided by the above components increases as the level of halogenation increases. As a result, the components can be preferably fully halogenated. In some instances, the components are fully fluorinated.

The second fire retardants can be perfluoroalkylamines, perfluorethers, and perfluorocycloalkanes. An example of a preferred perfluoroalkylamines includes a tris(perfluoroalkyl)amine such as tris(perfluoropentyl)amine. The perfluorocycloalkanes can be substituted with one or more alkyl groups or can be otherwise unsubstituted. An example of a preferred perfluorocycloalkane substituted with alkyl groups includes perfluoro-1,3-dimethylcyclohexane.

Other suitable second fire retardants include the second fire retardants disclosed in U.S. patent application Ser. No. 11/271,473, filed on Nov. 10, 2005, entitled Flame Retardant Battery, and incorporated herein in its entirety. Other suitable second fire retardants include the second fire retardants and/or the third fire retardants disclosed in U.S. patent application Ser. No. 11/272,261, filed on Nov. 10, 2005, entitled Flame Retardant Battery, and incorporated herein in its entirety. For instance, suitable second flame retardants include a fully or partially fluorinated compound selected from the group consisting of: alkanes, ethers, ketones, and amines substituted with one or more alkyl groups. The compound can be more than 60% fluorinated, more than 80% fluorinated. In some instances, the thermal suppression provided by the above components increases as the level of halogenation increases. As a result, preferred compounds can be fully fluorinated. Accordingly, suitable second flame retardants include perfluoro compounds and perfluorocarbons. In some instances, one or more of the second flame retardants are selected such that evaporation of the second flame retardant increases the heat capacity of the gaseous atmosphere in the battery above the heat capacity of the gaseous atmosphere before evaporation of the flame retardant. In some instances, the second phase and the one or more second flame retardants exclude ethers and specifically exclude fully or partially halogenated ethers. In some instances, a second flame retardant is a cyclic perfluoroalkane or a linear perfluoroalkane. Suitable perfluoroalkanes include, but are not limited to, perfluoropentane, perfluorohexane, perfluoroheptane, and perfluoroctane. Suitable perfluoroalkanes can be substituted or unsubstituted. In one example, a perfluoroalkane is substituted with one or more perfluoroalkyl groups. An example of a cyclic perfluoroalkane substituted with two perfluoroalkyl groups includes perfluoro-1,3-dimethylcyclohexane. In some instances, a second flame retardant is a ketone represented by R'(C=O)R" wherein R' is a perfluoroalkyl group and R" is a perfluoroalkyl group or an alkyl group. In some instances, the ketone is a perfluoroketone. An example of a suitable perfluoroketone includes, but is not limited to, dodecafluoro-2-methylpentan-3-one. In some instances, a second flame retardant is a linear or cyclic ether that is fully or partially fluorinated. Suitable cyclic ethers include perfluorocyclic ethers such as $C_8F_{16}O$, Suitable linear ethers are represented by R'OR" wherein R' is a perfluoroalkyl group and R" is a perfluoroalkyl group or an alkyl group. The linear ether can be a perfluoroether or a segregated hydrofluoroether. Examples of suitable segregated hydrofluoroethers include, but are not limited to, methoxy-heptafluoropropane, methoxy-nonafluorobutane, ethoxy-nonafluorobutane, and perfluorohexylmethylether. The ethers can be substituted with one or more perfluoroalkyl groups and/or one or more perfluoroalkoxy groups. An example of a substituted segregated hydrofluoroether includes 2-trifluoromethyl-3-ethoxydodecofluorohexane. In some instances, a second flame retardant is an amine substituted with one or more perfluoroalkyl groups. The perfluoroalkyl can all be the same or can be different. The amine can include a perfluoroalkyl substituent and two other substituents that are each a perfluoroalkyl group or an alkyl group. The amine can be a perfluoroalkylamine including perfluorotrialkylamines such as perfluorotripentylamine, perfluorotributylamine, and perfluorotripropylamine. Another example of a suitable amine includes perfluoro-n-dibutylmethylamine. The characteristics of various compounds that are suitable for use as a second flame retardant are presented below in Table 1. The characteristics can be employed to select the combinations of second flame retardants that are included in the second phase. The second phase can include a plurality of the second flame retardants. Suitable mixtures of the second flame retardants include, but are not limited to: mixtures of perfluoroalkanes; mixtures of amines substituted with one or more perfluoroalkyl groups, mixtures of perfluoroketones, mixtures of perfluoroethers, mixtures of segregated hydrofluoroethers, mixtures of one or more perfluoroalkanes and one or more perfluorocyclic ethers, a mixture of perfluoro-n-butylamine and perfluoro-n-dibutylmethylamine, mixtures of one or more perfluoroalkanes and one or more segregated hydrofluoroethers, mixtures of one or more perfluoroalkanes and/or mixtures of one or more amine substituted with one or more perfluoroalkyl groups and/or perfluoroketone and/or perfluoroethers and/or mixtures of one or more segregated hydrofluoroethers.

carbonate (EC), butylene carbonate, acetonitrile, dimethyl sulfoxide, dimethyl formamide, dimethyl acetamide, γ-valerolactone, γ-butyrolactone (GBL), and mixtures thereof. An example solvent includes a mixture of DME and PC. A preferred electrolyte includes one or more first solvents and one or more second solvents. Suitable volume ratios of the one or more first solvents to the one or more second solvents include, but are not limited to, ratios in a range of: 30:70 to 80:20. In a preferred example the ratio is in a range of 50:50 to 70:30.

The principles of the invention are preferably applied to electrolytes that include organic solvents as a result of the volatility associated with these solvents. However, the electrolyte can include other solvents associated with lower levels of volatility such as polysiloxanes, tetrasiloxane, trisloxanes, disiloxanes, and silanes. Examples of suitable polysiloxane electrolytes are disclosed in U.S. patent application Ser. No. 10/810,019, filed on Mar. 25, 2004, entitled "Polysiloxane for Use in Electrochemical Cells," and incorporated herein in its entirety. Examples of suitable tetrasiloxane and tetrasiloxane electrolytes are disclosed in U.S. Provisional Patent Application Ser. No. 60/543,951, filed on Feb. 11, 2004, entitled "Siloxanes;" and in U.S. patent application Ser. No. 10/971,926, filed on Oct. 21, 2004, and entitled "Electrochemical Device Having Electrolyte Including Tetrasiloxane;" and in U.S. patent application Ser. No. 11/056,868, filed on Feb. 10, 2005, and entitled "Electrochemical Device Having Electrolyte Including Tetrasiloxane;" each of which is incorporated herein in its entirety. Examples of suitable trisiloxanes and

TABLE 1

| | Density (g/cc) | Boiling Point (° C. at 1 atm) | Heat Capacity (J/kg ° C. at 25° C.) | Heat of Vaporization (J/g at boiling point and 1 atm) | Vapor Pressure (kPa) |
| --- | --- | --- | --- | --- | --- |
| Perfluoropentane | 1.63 | 30 | 1045-1100 | 100-103 | 81.3 |
| Methoxy-heptafluoropropane | 1.40 | 34 | 1300 | 142 | 64.6 |
| Dodecafluoro-2-methylpentan-3-one | 1.60 | 49 | 1045-1100 | 88 | 40.4 |
| Perfluorohexane | 1.68 | 56 | 1045-1100 | 88-92 | 30.9 |
| Methoxy-nonafluorobutane | 1.51 | 61 | 1180 | 112 | 26.8 |
| Ethoxy-nonafluorobutane | 1.42 | 76 | 1220 | 119 | 15.7 |
| Perfluoroheptane | 1.73 | 80 | 1045-1100 | 79-80 | 10.5 |
| Perfluorohexylmethylether | 1.66 | 97 | 1140 | 102 | 6 |
| Perfluoroctane | 1.76 | 101 | 1100 | 94 | 3.8 |
| Perfluorotripropylamine | 1.82 | 128 | 1200 | 75-82 | 1.5 |
| 2-trifluoromethyl-3-ethoxydodecofluorohexane | 1.61 | 130 | 1130 | 88.5 | 2.1 |
| Perfluorotributylamine | 1.88 | 174 | 1045-1100 | 70-71 | 0.17 |
| Perfluorotripentylamine | 1.94 | 215 | 1045-1100 | 67-69 | <0.01 |
| Perfluorotributylamine mixed with Perfluoro-n-dibutylmethylamine | 1.87 | 155 | 1045-1100 | 68-71 | 1.7 |

As noted above, the electrolyte includes one or more salts in a solvent. The solvent can be an organic liquid. The solvent can include or consist of one or more first organic solvents and/or one or more second organic solvents. In some instance, the first solvent is a low viscosity solvent and the second solvent is a high permittivity solvent. Examples of the first solvent include, but are not limited to, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate (EMC), methyl propyl carbonate, ethyl propyl carbonate, diethyl carbonate (DEC), dipropyl carbonate, and mixtures thereof. Examples of second solvents include, but are not limited to, cyclic carbonates, cyclic esters and cyclic amides such as propylene carbonate (PC), ethylene trisiloxane electrolytes are disclosed in U.S. Provisional Patent Application Ser. No. 60/543,951, filed on Feb. 11, 2004, entitled "Siloxanes;" and U.S. Provisional Patent Application Ser. No. 60/542,017, filed on Feb. 4, 2004, entitled "Nonaqueous Electrolyte Solvents for Electrochemical Devices;" and U.S. Provisional Patent Application Ser. No. 60/543,898, filed on Feb. 11, 2004, entitled "Siloxane Based Electrolytes for Use in Electrochemical Devices;" and in U.S. patent application Ser. No. 10/971,913, filed on Oct. 21, 2004, and entitled "Electrochemical Device Having Electrolyte Including Trisiloxane;" and in U.S. patent application Ser. No. 11/056,867, filed on Feb. 10, 2005, and entitled "Electrochemical Device Having Electrolyte Including Trisiloxane;" each of which is incorporated herein in its entirety. Examples of suitable disiloxanes and disiloxane electrolytes are disclosed in U.S. Provisional Patent Application Ser. No.

60/543,951, filed on Feb. 11, 2004, entitled "Siloxanes;" and U.S. Provisional Patent Application Ser. No. 60/542,017, filed on Feb. 4, 2004, entitled "Nonaqueous Electrolyte Solvents for Electrochemical Devices;" and U.S. Provisional Patent Application Ser. No. 60/543,898, filed on Feb. 11, 2004, entitled "Siloxane Based Electrolytes for Use in Electrochemical Devices," and in U.S. patent application Ser. No. 10/971,507, filed on Oct. 21, 2004, and entitled "Electrochemical Device Having Electrolyte Including Disiloxane;" and in U.S. patent application Ser. No. 11/056,869, filed on Feb. 10, 2005, and entitled "Electrochemical Device Having Electrolyte Including Disiloxane;" each of which is incorporated herein in its entirety. Examples of suitable silanes and silane electrolytes are disclosed in U.S. Provisional Patent Application Ser. No. 60/601,452, filed on Aug. 13, 2004, entitled "Electrolyte Including Silane for Use in Electrochemical Devices;" and in U.S. patent application Ser. No. 10/977,313, filed on Oct. 28, 2004, and entitled "Electrolyte Including Silane for Use in Electrochemical Device;" and in U.S. patent application Ser. No. 11/056,869, filed on Feb. 10, 2005, and entitled "Electrolyte Including Silane for Use in Electrochemical Device;" each of which is incorporated herein in its entirety.

Suitable salts for use with the electrolyte include, but are not limited to, alkali metal salts including lithium salts. Examples of lithium salts include $LiClO_4$, $LiBF_4$, $LiAsF_6$, $LiPF_6$, $LiSbF_6$, $LiCF_3SO_3$, $LiC_6F_5SO_3$, $LiC(CF_3SO_2)_3$, $LiN(SO_2C_2F_5)_2$, $LiN(SO_2CF_3)_2$, $LiAlCl_4$, $LiGaCl_4$, $LiSCN$, $LiO_2$, $LiO_3SCF_3$, $LiO_2CCF_3$, $LiSO_6F$, $LiB(C_6H_5)_4$, Li-methide, Li-imide, lithium alkyl fluorophosphates, and mixtures thereof. Preferred salts include $LiPF_6$ and $LiBF_4$. The electrolyte can be prepared such that the salt has a concentration greater than 0.1 M, 0.5 M or greater than 0.7 M and/or less than 1.5 M, less than 2 M, or less than 5 M. For instance, the electrolyte can include 0.8 M to 1.5 M $LiAsF_6$ or $LiPF_6$ in a 50:50 mixture, by volume, of propylene carbonate and 1,2-dimethoxyethane. Another example of the electrolyte includes electrolyte 1.2 M $LiBF_4$ in a 30:70 by volume mixture of PC and DME.

The electrolyte can optionally include one or more passivation additives. As noted above, the electrolyte includes one or more passivation additives that form a passivation layer on the anode. In some instances, the passivation additive is reduced and polymerizes at the surface of the anode to form the passivation layer. Vinyl carbonate (VC) and vinyl ethylene carbonate (VEC) are examples of additives that can form a passivation layer by being reduced and polymerizing to form a passivation layer. The result of the reduction in the presence of lithium is $Li_2CO_3$ and butadiene that polymerizes in the presence of an available electron at the anode surface. Ethylene sulfite (ES) and propylene sulfite (PS) form passivation layers by mechanisms that are similar to VC and VEC. In some instances, one or more of the passivation additives has a reduction potential that exceeds the reduction potential of the components in the solvent. For instance, VEC and VC have a reduction potential of about 2.3V. This arrangement of reduction potentials can encourage the passivation additive to form the passivation layer before reduction of other electrolyte components and can accordingly reduce consumption of other electrolyte components.

Suitable passivation additives include, but are not limited to, carbonates having one or more unsaturated substituents. For instance, suitable passivation additives include unsaturated and unsubstituted cyclic carbonates such as vinyl carbonate (VC); cyclic alkylene carbonates having one or more unsaturated substituents such as vinyl ethylene carbonate (VEC), and o-phenylene carbonate (CC, $C_7H_4O_3$); cyclic alkylene carbonates having one or more halogenated alkyl substituents such as ethylene carbonate substituted with a trifluormethyl group (trifluoropropylene carbonate, TFPC); linear carbonates having one or more unsaturated substituents such as ethyl 2-propenyl ethyl carbonate ($C_2H_5CO_3C_3H_5$); saturated or unsaturated halogenated cyclic alkylene carbonates such as fluoroethylene carbonate (FEC) and chloroethylene carbonate (CIEC). Other suitable passivation additives include, acetates having one or more unsaturated substituents such as vinyl acetate (VA). Other suitable passivation additives include cyclic alkyl sulfites and linear sulfites. For instance, suitable passivation additives include unsubstituted cyclic alkyl sulfites such as ethylene sulfite (ES); substituted cyclic alkylene sulfites such as ethylene sulfite substituted with an alkyl group such as a methyl group (propylene sulfite, PS); linear sulfites having one or more one more alkyl substituents and dialkyl sulfites such as dimethyl sulfite (DMS) and diethyl sulfite (DES). Other suitable passivation additives include halogenated-gamma-butyrolactones such as bromo-gamma-butyrolactone (BrGBL) and fluoro-gamma-butyrolactone (FGBL).

The passivation additives can include or consist of one or more passivation additives selected from the group consisting of: dimethyl sulfite (DMS), diethyl sulfite (DES), bromo-gamma-butyrolactone (BrGBL), fluoro-gamma-butyrolactone (FGBL), vinyl carbonate (VC), vinyl ethylene carbonate (VEC), ethylene sulfite (ES), CC, trifluoropropylene carbonate (TFPC), 2-propenyl ethyl carbonate, fluoroethylene carbonate (FEC), chloroethylene carbonate (CIEC), vinyl acetate (VA), propylene sulfite (PS), 1,3 dimethyl butadiene, styrene carbonate, phenyl ethylene carbonate (PhEC), aromatic carbonates, vinyl pyrrole, vinyl piperazine, vinyl piperidine, vinyl pyridine, and mixtures thereof. In another example, the electrolyte includes or consists of one or more passivation additives selected from the group consisting of vinyl carbonate (VC), vinyl ethylene carbonate (VEC), ethylene sulfite (ES), propylene sulfite (PS), and phenyl ethylene carbonate (PhEC). In a preferred example, the electrolyte includes or consists of one or more passivation additives selected from the group consisting of vinyl carbonate (VC), vinyl ethylene carbonate (VEC), ethylene sulfite (ES), and propylene sulfite (PS). In another preferred example, the electrolyte includes vinyl carbonate (VC) and/or vinyl ethylene carbonate (VEC).

Certain organoborate salts can also serve as a passivation additive. For instance, lithium bis(oxalato)borate (LiBOB) and lithium difluoro oxalato borate (LiDfOB) are examples of organoborate salts that can form a passivation layer on an anode.

Suitable organoborate salts include aromatic lithium bis[bidentate] borates, also known as a bis[chelato] borate, such as bis[benzenediolato (2-)-O,O'] borate, bis[substituted benzenediolato (2-)-O,O'] borate, bis[salicylato] borate, bis[substituted salicylato] borate, bis[2,2'-biphenyldiolato (O,O')] borate, and bis[substituted 2,2'-biphenyldiolato (O,O')] borate]. In some instances, the organoborate salt is a nonaromatic bis[chelato] borate, such as bis[oxalato (2-O,O'] borate, bis[malonato (2-)-O,O'] borate, bis[succinato] borate, [.alpha.-hydroxy-carboxylato] borate, [.alpha.-hydroxy-carboxylato] borate, [.beta.-hydroxy-carboxylato] borate, [.beta.-hydroxy-carboxylato] borate, [.alpha.-dicarboxylato] borate, and [.alpha.-dicarboxylato] borate. In some instances, the organoborate salt is a mono[bidentate] borate, a tridentate borate, or a tetradentate borate. Examples of suitable organoborate salt include lithium bis(tetrafluoroethylenediolato) borate $LiB(OCF_2CF_2O)_2$, lithium bis(hexafluoropropylenediolato)borate $LiB[OCF(CF_3)CF_2O]_2$ and lithium bis[1,2- tetrakis(trifluoromethyl)ethylenedialato(2-)O,O-']borate or lithium bis(perfluoropinacolato)borate LiB[OC(CF$_3$)$_2$C(CF$_3$)$_2$O]$_2$ or LiB[OC(CF$_3$)$_2$]$_4$. Preferred lithium organoborate salts are lithium bis-oxalato borate (LiBOB), and lithium difluoro oxalato borate (LiDfOB).

Examples of suitable organoborate salts are disclosed in U.S. Patent Application Ser. No. 60/565,211, filed on Apr. 22, 2004, entitled "Organoborate Salt in Electrochemical Device Electrolytes" and incorporated herein in its entirety.

One example of the organoborate salt includes: a boron linked directly to at least two oxygens and an organic moiety linking two of the oxygens. In some instances, the boron is also linked directly to two halogens. Another example of the organoborate salt includes: a boron linked directly to each of four oxygens; a first organic moiety linking two of the oxygens; and a second organic moiety linking the other two oxygens. The first organic moiety and the second organic moiety can be the same or different. The first organic moiety and/or the second organic moiety can be: substituted or unsubstituted; and/or branched or unbranched; and/or saturated or unsaturated. The backbone of an organic moiety extending between the boron linked oxygens can include only carbons or can include carbons and one or more oxygens. In some instances, one or both of the organic moieties are halogenated. In one example, the first organic moiety and/or the second organic moiety is fluorinated.

An example of the organoborate salt is represented by the following Formula I-A:

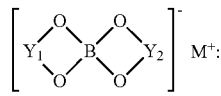

wherein M$^+$ is a metal ion selected from the Group I or Group II elements; Y$_1$ and Y$_2$ are each selected from the group consisting of —CX(CR$_2$)$_a$CX—, —CZZ'(CR$_2$)$_a$CZZ'—, —CX(CR$_2$)$_a$CZZ'—, —SO$_2$(CR$_2$)$_b$SO$_2$—, and —CO(CR$_2$)$_b$SO$_2$—; X is =O or =NR', Z is alkyl, halogenated alkyl, —C=NR', CR'$_3$ or R; Z' is alkyl, halogenated alkyl, —C=NR', CR'$_3$ or R'; R' is halogen or hydrogen; R is hydrogen, alkyl, halogenated alkyl, cyano, or halogen; a is 0 to 4 and b is 1 to 4. M$^+$ is preferably selected from Group I and is most preferably lithium. Y$_1$ and Y$_2$ can be the same or different. Z and Z' can be the same or different. The R' can be the same or different and the R can be the same or different.

In an example of an organoborate salt according to Formula I-A, Y$_1$ and Y$_2$ are each —CX(CR$_2$)$_a$CX—; each X is =O and each R is hydrogen. In another example of the organoborate salt, Y$_1$ and Y$_2$ are each —CX(CR$_2$)$_a$CX—; each X is =O and each R is a halogen. In another example of the organoborate salt, Y$_1$ and Y$_2$ are each —CX(CR$_2$)$_a$CX—; each X is =O and each R is fluoro.

In a preferred example of an organoborate salt according to Formula I-A, Y$_1$ and Y$_2$ are each —CZZ'(CR$_2$)$_a$CZZ'—; each of the R' is hydrogen and each of the R are hydrogen. In another preferred example, Y$_1$ and Y$_2$ are each —CZZ'(CR$_2$)$_a$CZZ'—; each of the R' is halogen and each of the R are halogens. In another preferred example, Y$_1$ and Y$_2$ are each —CZZ'(CR$_2$)$_a$CZZ'—; each of the R' is fluorine and each of the R are fluorine.

Another example of the organoborate salt is represented by the following Formula I-B:

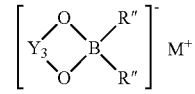

wherein M$^+$ is a metal ion selected from the Group I or Group II elements; Y$_3$ is selected from the group consisting of —CX(CR$_2$)$_a$CX—, —CZZ'(CR$_2$)$_a$CZZ'—, —CX(CR$_2$)$_a$CZZ'—, —SO$_2$(CR$_2$)$_b$SO$_2$—, and —CO(CR$_2$)$_b$SO$_2$—; X is =O or =NR', Z is alkyl, halogenated alkyl, —C=NR', CR'$_3$ or R; Z' is alkyl, halogenated alkyl, —C=NR', CR'$_3$ or R; R" is a halogen; R' is halogen or hydrogen; R is hydrogen, alkyl, halogenated alkyl, cyano, or halogen; a is 0 to 4 and b is 1 to 4. M$^+$ is preferably selected from Group I and is most preferably lithium. Z and Z' can be the same or different. The R" can be the same or different. The R' can be the same or different. The R can be the same or different.

In an example of an organoborate salt according to Formula I-B, Y$_3$ is —CX(CR$_2$)$_a$CX—; each X is =O and each R" is a halogen. In another example of the organoborate salt, Y$_3$ is —CX(CR$_2$)$_a$CX— and each R" is a fluorine.

When the electrolyte includes one or more passivation additives, the electrolyte can optionally include one or more substituted borane additives. The borane additives can reduce the presence of the LiF formed during the formation of the passivation layer. Reducing the level of LiF can enhance the stability of the passivation layer that can further enhance the capacity and cycling properties of batteries.

Suitable borane additives include aryl boronates such as phenyl boronates. The aryl group can be substituted or unsubstituted. Formula II-A represents an example of a phenyl boronate with an unsubstituted phenyl group.

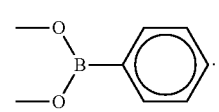

Formula II-A

A substituted aryl group can be partially or fully halogenated. For instance, the aryl group can be fully or partially fluorinated. Formula II-B, Formula II-C and Formula II-D each represent a boronate having a partially fluorinated phenyl group.

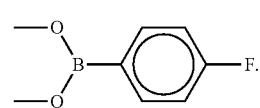

Formula II-B

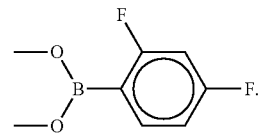

Formula II-C

Formula II-D

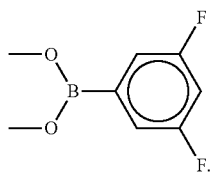

Formula II-E represents an example of a boronate having a fully fluorinated phenyl group.

Formula II-E

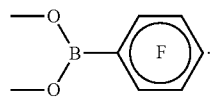

In some instances, the aryl group is substituted with one or more alkyl groups. The phenyl group and/or the substituents can be fully or partially halogenated. For instance, the aryl group and/or the substituents can be fully or partially fluorinated. Formula II-F represents an example of a boronate with a phenyl group substituted with a fully fluorinated alkyl group (trifluoromethyl).

Formula II-F

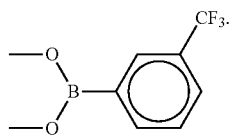

Formula II-G represents an example of a boronate substituted with two fully fluorinated alkyl groups.

Formula II-G

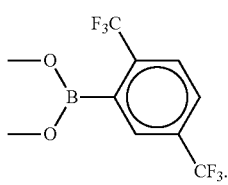

The borane additives can be linear boronates. For instance, the boronate oxygens can each be directly linked to a different branched or unbranched and acyclic or cyclic alkyl group. In some instances, the boronate oxygens are each linked directly to a branched or unbranched, cyclic or acyclic alkyl group that is partially or fully halogenated or to a substituted or unsubstituted aryl group that is partially or fully halogenated. For instance, the boronate oxygens can each be linked directly to a branched or unbranched alkyl group that is partially or fully fluorinated. Formula III-A represents an example of a linear boronate having each of the boronate oxygens linked to a different branched alkyl group that is fully fluorinated.

Formula III-A

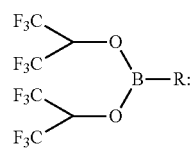

wherein R represents a phenyl groups as disclosed above. In some instance, R represents one of the phenyl groups from Formula II-A through Formula II-G. Formula III-B, Formula III-C and Formula III-D each represent a preferred embodiment of a linear phenyl boronates where the boronate oxygens are linked to branched alkyl groups.

Formula III-B

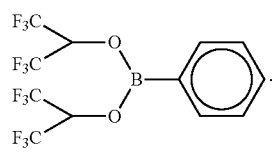

Formula III-C

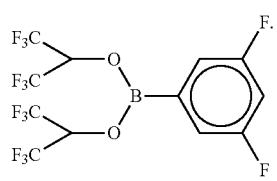

Formula III-D

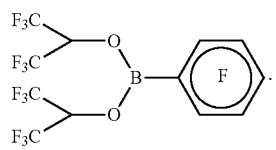

Formula III-E represents an example of a linear boronate having each of the boronate oxygens linked to an aryl group that is fully fluorinated.

Formula III-E

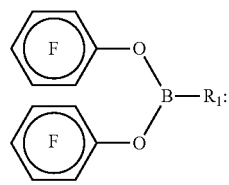

wherein $R_1$ represents a phenyl groups as disclosed above. In some instance, $R_1$ represents one of the phenyl groups from Formula II-A through Formula II-G. Formula III-F represents a preferred embodiment of a linear phenyl boronates where the boronate oxygens are each linked to a different phenyl groups.

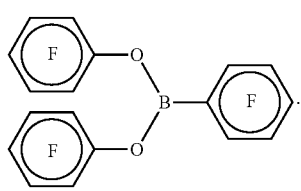

Formula III-F

The borane additive can be a cyclic phenyl borate. For instance, each of the boronate oxygens can be linked to opposing ends of an alkylene group. In some instances, the boronate oxygens are each linked to a branched or unbranched alkylene group that is partially or fully halogenated. Formula III-G represents an example of a cyclic boronate having each of the boronate oxygens linked to an ethylene group that is both branched and fully fluorinated.

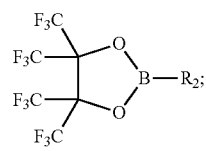

Formula III-G wherein $R_2$ represents a phenyl groups as disclosed above. In some instance, $R_2$ represents one of the phenyl groups from Formula II-A through Formula II-G. Formula III-H, Formula III-I and Formula III-J each represent a preferred embodiment of a linear phenyl boronates where the boronate oxygens are linked to branched alkyl groups.

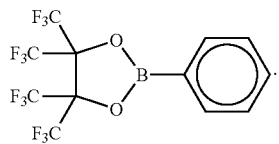

Formula III-H

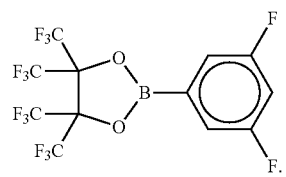

Formula III-I

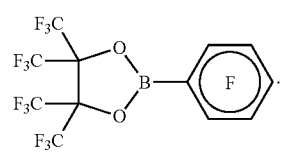

Formula III-J

In some instances, the boronate oxygens are each linked to an alkylene group that is part of a bivalent cyclic moiety. For instance, the boronate oxygens can each be linked directly to a bivalent aryl group such as a phenylene group. The cyclic group can be fully or partially halogenated. For instance, the cyclic group can be fully or partially fluorinated. Formula III-K represents an example of a cyclic boronate having each of the boronate oxygens linked to a partially fluorinated o-phenylene group.

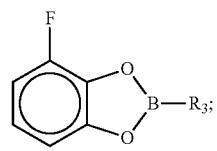

Formula III-K wherein $R_3$ represents a phenyl groups as disclosed above. In some instance, $R_3$ represents one of the phenyl groups from Formula II-A through Formula II-G. Formula III-L, Formula III-M and Formula III-N each represent a preferred embodiment of a cyclic phenyl boronates where the boronate oxygens are each linked to a partially fluorinated o-phenylene groups.

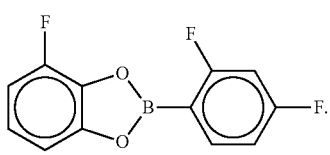

Formula III-L

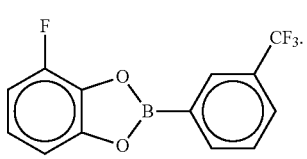

Formula III-M

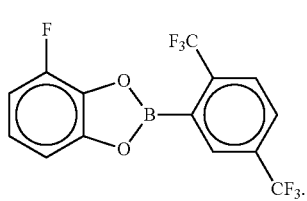

Formula III-N

Formula III-O represents an example of a cyclic boronate having each of the boronate oxygens linked to a fully fluorinated o-phenylene group.

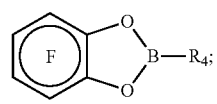

Formula III-O wherein $R_4$ represents a phenyl groups as disclosed above. In some instance, $R_4$ represents one of the phenyl groups from Formula II-A through Formula II-G. Formula III-P, Formula III-Q, Formula III-R, Formula III-S, and Formula III-T each represent a preferred embodiment of a cyclic phenyl boronates where the boronate oxygens are each linked to a fully fluorinated o-phenylene groups.

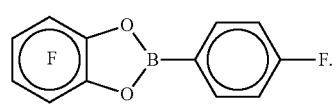

Formula III-P

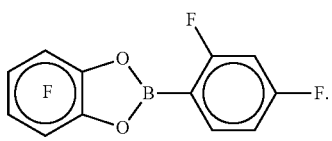

Formula III-Q

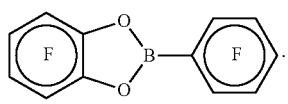

Formula III-R

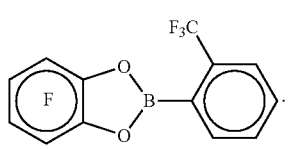

Formula III-S

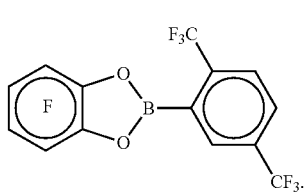

Formula III-T

The borane additives can be tris-substituted borates where each of the substitutents is the same. For instance, the borane additive can be represented by Formula IV-A. Formula IV-A: $BR'_3$; wherein R' represents —R" or —OR" wherein —R" represents a cyclic or acyclic, and branched or unbranched, and substituted or unsubstituted alkyl group, or a substituted or unsubstituted aryl group.

In some instances, R" represents a fully or partially halogenated, unbranched and acyclic alkyl group. For instance, R" can represent a fully or partially fluorinated, unbranched and acyclic alkyl group. Formula IV-B and Formula IV-C each represent an example of R" as a partially fluorinated, unbranched and acyclic alkyl group. Formula IV-B: $F_3C$—$CH_2$—. Formula IV-C: $F_7C_3$—$CH_2$—. In one example, R' represents-OR" and R" represents a fully or partially halogenated, unbranched and acyclic alkyl group such as the fluorinated acyclic alkyl group represented in Formula IV-B or Formula IV-C.

In some instances, R" represents a fully or partially halogenated, branched and acyclic alkyl group. For instance, R" can represent a fully or partially fluorinated, branched and acyclic alkyl group. Formula IV-D represents an example of R" as a partially fluorinated, branched and acyclic alkyl group.

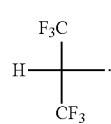

Formula IV-D

Formula IV-E represents an example of R" as a fully fluorinated, branched and acyclic alkyl group.

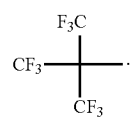

Formula IV-E

In one example, R' represents —OR" and R" represents a fully or partially halogenated, branched and acyclic alkyl group such as the fluorinated, branched and acyclic alkyl group represented in Formula IV-D or Formula IV-E.

In some instances, R" represents a fully or partially halogenated, branched, and substituted alkyl group. For instance, R" can represent a fully or partially fluorinated, branched, and substituted alkyl group. Formula IV-F represents an example of R" as a branched alkyl group substituted with a phenyl group where the alkyl group and the branches are fully fluorinated but the phenyl group is unhalogenated.

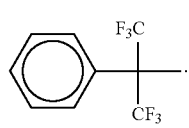

Formula IV-F

In one example, R' represents —OR" and R" represents a fully or partially halogenated, branched and substituted alkyl group such as the fluorinated, branched and substituted alkyl group represented in Formula IV-F.

In some instances, R" represents a fully or partially halogenated aryl group such as a fully or partially fluorinated phenyl group. Formula IV-G represents an example of R" as a fully fluorinated phenyl group.

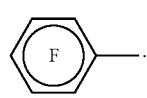

Formula IV-G

Formula IV-H and Formula IV-I represent an example of R" as a partially fluorinated phenyl group.

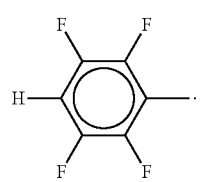

Formula IV-H

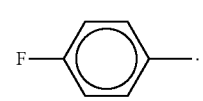

Formula IV-I

In one example, R' represents —OR" and R" represents a fully or partially halogenated aryl group such as the fluorinated, phenyl group represented in Formula IV-G, Formula IV-H, or Formula IV-I. In another example, R' represents —R" and —R" represents a fully halogenated aryl group such as the fully fluorinated phenyl group represented in Formula IV-G.

In some instances, R" represents a fully or partially halogenated and substituted aryl group. In one example, the aryl group substituents are fully or partially halogenated alkyl groups and/or the aryl group is fully or partially halogenated. Formula IV-J represents an example of R" as an unhalogenated phenyl group substituted with a fully fluorinated alkyl group (trifluoromethyl).

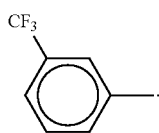

Formula IV-J

Formula IV-K represents an example of R" as an unhalogenated phenyl group substituted with two fully fluorinated alkyl groups (trifluoromethyl).

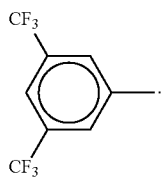

Formula IV-K

Formula IV-L represents an example of R" as a partially fluorinated phenyl group substituted with an unhalogenated alkyl group.

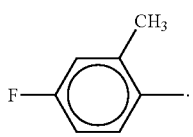

Formula IV-L

In one example, R' represents —OR" and R" represents a fully or partially halogenated, and substituted aryl group such as the fluorinated, substituted phenyl group represented in Formula IV-J, Formula IV-K, or Formula IV-L.

One or more of the above borane additives may be available from Brookhaven National Laboratories.

The electrolyte can be generated by combining the one or more salts with the solvent. When the electrolyte includes passivation additives and/or borane additives, the passivation additives and/or the borane additives can be combined with the one or more salts and the solvent. In some instances, other components are combined with the solvent. For instance, the monomers for an interpenetrating network can also be combined with the solvent. A suitable concentration for the one or more salts in the electrolyte is a concentration greater than 0.1 M, 0.5 M or greater than 0.7 M and/or less than 1.5 M, less than 2 M, or less than 5 M. For instance, the electrolyte can include 0.8 M to 1.5 M $LiAsF_6$ or $LiPF_6$ in a 50:50 mixture, by volume, of propylene carbonate and 1,2-dimethoxyethane. Another example of the electrolyte includes electrolyte 1.2 M $LiBF_4$ in a 30:70 by volume mixture of PC and DME.

In some instances where the electrolyte includes one or more passivation additives, the concentration of a passivation additive does not substantially exceed the concentration needed to form the passivation layer(s). An excess concentration of the passivation additive can produce an excessively thick passivation layer that increases the internal resistance of the battery and/or increase voltage delay. Additionally, it is currently believed that excess amounts of certain passivation additives, such as organoborate salts, in the electrolyte can reduce the electrolyte conductivity. Suitable concentration for a particular passivation additive before discharge of the battery in the electrolyte includes, but is not limited to, concentrations greater than 0.005, greater than 0.001 M and/or less than 0.05 M, less than 0.2 M or less than 1.0 M. In a preferred embodiment, before discharge of the battery at least passivation additive is present in the electrolyte at a concentration of less than 0.1 M. A suitable concentration for the total amount of passivation additive in the electrolyte before discharge of the battery includes, but is not limited to, concentrations greater than 0.005, greater than 0.001 M and/or less than 0.05 M, less than 0.2 M or less than 1.0 M.

When the electrolyte includes an organoborate salt as a passivation additive, the total concentration of the organoborate salts in the electrolyte before discharge of the battery can be smaller than the total concentration of the one or more non-organoborate salts. Before discharge of the battery or before formation of the passivation layer, a suitable molar ratio of the total concentration of the non-organoborate salts: total organoborate concentration ratios greater than 4:1, 10:1, 40:1, or 200:1 and/or less than 50:1, 100:1, 400:1 or 800:1. In some instances, the molar ratio is in a range of 50:1 to 200:1. The concentration of the one or more organoborate salts may drop after formation of the passivation layer because the one or more organoborate salts may be consumed during formation of the passivation layer. In some instances, the concentration of the organoborate salt(s) that form the passivation layer on anode and/or cathode substantially exceeds the concentration needed to form the passivation layer.

Suitable separators 46 include, but are not limited to, polyethylene, fabrics woven from fluoropolymeric fibers including polyvinylidine fluoride, polyethylenetetrafluoroethylene, and polyethylenechlorotrifluoroethylene used either alone or laminated with a fluoropolymeric microporous film, nonwoven glass, polypropylene, polyethylene, glass fiber materials, ceramics, polytetrafluoroethylene membrane, polypropylene/polyethylene membrane commercially available under the designation CELGARD (Celanese Plastic Company, Inc.), and a polyethylene membrane commercially available from Tonen Chemical Corp. When the first fire retardant is to be included in a separator, the separator can be soaked in the first fire retardant or coated with the first fire retardant before assembly of the battery. Alternately, the first fire retardant can penetrate into the separator from the electrolyte after the assembly of the battery.

A suitable material for the anode substrate includes, but is not limited to, titanium, a titanium alloy, stainless steel, nickel, copper, tungsten, tantalum or alloys thereof.

The anode medium 52 includes or consists of one or more anode active materials and a binder. The anode active material can include or consist of a metal selected from Groups IA, IIA and IIIB of the Periodic Table of the Elements. Examples of these anode active materials include lithium, sodium, potassium, etc., and their alloys and intermetallic compounds including, for example, Li—Si, Li—Al, Li—B and Li—Si—B alloys and intermetallic compounds. Alternative suitable anode active materials include lithium alloys such as a lithium-aluminum alloy. The greater the amounts of aluminum present by weight in the alloy, however, the lower the energy density of the cell. Other alternative suitable anode active materials include graphite or other carbon, $Cu_6Sn_5$, $Cu_2Sb$, MnSb, other metal alloys, $Li_4Ti_5O_{12}$, silica alloys, or mixtures of suitable anode active materials.

In some instances, the anode consists of the anode medium. Accordingly, the anode medium can serve as the anode. For instance, the anode can include or consist of lithium metal or a lithium metal alloy. Lithium metal can be sufficiently conductive that an anode substrate is not necessary.

When an anode is to be formed from materials in a powdered or granular form, an anode can be generated by mixing the components of the anode medium in a slurry. Coating the slurry on the anode substrate material and drying the slurry so as to form the anode medium on the substrate. When the first fire retardant is to be included in an anode, the first fire retardant can be included in the slurry. Alternately or additionally, the anode can be soaked in the first fire retardant or coated with the first fire retardant. Alternately, the first fire retardant can penetrate into the anode from the electrolyte after the assembly of the battery.

Suitable cathode substrates 50 include, but are not limited to, stainless steel, titanium, tantalum, platinum, aluminum, gold, nickel, or an alloy thereof.

The cathode medium 48 includes or consists of a plurality of cathode active materials and one or more binders. Suitable binders include, but are not limited to, carboxymethyl cellulose (CMC), fluoropolymer, polytetrafluoroethylene or polyvinylidene fluoride. In some instances, the cathode medium includes a conductive diluent to further increase conductivity if needed. Suitable diluents include, but are not limited to, acetylene black, carbon black and/or graphite or metallic powders such as powdered nickel and aluminum. In some instances, the cathode medium excludes a conductive diluent.

Suitable cathode active materials include, but are not limited to, fluorinated carbon ($CF_x$), lithium vanadium oxide such as the lithium vanadium oxide represented by $Li_{1+y}V_3O_8$, polypyrrole, $H_2V_3O_8$, metal vanadium oxides represented by $M_zH_{1-z}V_3O_8$, $CuCl_2$, silver vanadium oxides such as $Ag_2V_4O_{11}$, $LiCuCl_2$, $TiS_2$, $MoO_2$, $MoS_2$, $MnO_2$, $V_2O_5$, $V_6O_{13}$, $H_2V_3O_8$, $LiCoO_2$, $LiNiO_2$, $LiMnO_2$, $LiCoNiMnO_2$, $LiCoNiM'O_2$, and combinations thereof. In some instances, the cathode active materials include or consist of one or more first active materials and one or more second active materials. Suitable first active materials include, but are not limited to, $CF_x$, $CuCl_2$, $LiCuCl_2$, $MnO_2$ and $V_2O_5$. In an example, the first active material includes or consists of $CF_x$. Suitable second active materials include, but are not limited to, lithium vanadium oxide such as the lithium vanadium oxide represented by $Li_{1+y}V_3O_8$, silver vanadium oxides such as $Ag_2V_4O_{11}$, $TiS_2$, polypyrrole, $MoO_2$, $MoS_2$, $H_2V_3O_8$, metal vanadium oxides represented by $M_zH_{1-z}V_3O_8$, $MnO_2$, $V_2O_5$, and $V_6O_{13}$. In an example, the first active material includes or consists of lithium vanadium oxide represented by $Li_{1+y}V_3O_8$. One example of the lithium vanadium oxide includes $Li_{1.2}V_3O_8$. In the compounds listed above, x can be greater than 0.2, and/or less than 1.2 before the initial discharge of the battery, y can be greater than 0 and/or less than 0.3 before the initial discharge of the battery, z can be greater than zero and/or less than or equal to 1 before discharge of the battery, M represents Na, Mg, Ba, K, Co, Ca and combinations thereof, and M' represents Na, Mg, Ba, K, Co, Ca and combinations thereof.

An example of the cathode medium includes or consists of $CF_x$ as a first active material and lithium vanadium oxide, polypyrrole, $MoO_2$, $MoS_2$ or combinations thereof as a second active material. Another example of the cathode medium includes or consists of $CF_x$ as a first active material and lithium vanadium oxide as a second active material. Yet another example of the cathode medium includes or consists of $CF_x$ as a first active material and silver vanadium oxide as a second active material. Still another example of the cathode medium includes $CuCl_2$, $LiCuCl_2$, $MnO_2$, $V_2O_5$ or combinations thereof as a first active material and lithium vanadium oxide, polypyrrole, $MoO_2$, $MoS_2$ or combinations thereof as a second active material. In some instances, a first active material such as $CF_x$ is not rechargeable. When the first active material is not rechargeable, the battery may function as a primary battery. When the first active material and the second active material are both rechargeable, the battery may function as a secondary battery.

If the cathode active material includes or consist of, one or more first active materials and one or more second active materials, a suitable mass ratios of the one or more first active materials to the one or more second active materials in the cathode include, but are not limited to, ratios greater than 10:90, or greater than 20:80, or greater than 30:70 and/or less than 70:30, or less than 90:10, or less 80:20. Additionally, suitable ratios of the one or more first active materials ratios can be in a range of: 30:70 to 70:30 or 40:60 to 60:40. These ratios may change as function of the battery application. For instance, increased first active material can increase capacity but reduce rate capabilities.

To make a cathode, a mixture of the one or more cathode active materials and water are mixed together to form a slurry. The slurry is applied to the cathode substrate at the desired locations and dried. In some instances, a conductor such as carbon black and/or a binder such as polytetrafluoroethylene (PTFE) are added to the slurry. An additional binder such as carboxymethyl cellulose (CMC) in water can optionally be added to the slurry. A cathode substrate such as an aluminum substrate is coated with the slurry, dried by evaporation, and then rolled to the desired thickness. When the first fire retardant is to be included in a cathode, the first fire retardant can be included in the slurry. Alternately or additionally, the cathode can be soaked in the first fire retardant or coated with the first fire retardant. Alternately, the first fire retardant can penetrate into the cathode from the electrolyte after the assembly of the battery.

Examples of suitable cathode constructions are set forth in U.S. patent application Ser. No. 10/984,434, filed on Nov. 8, 2004, entitled "Battery Having High Rate and Low Rate/High Capacity Capabilities," and incorporated herein in its entirety.

A battery can be constructed by generating an electrode assembly that includes a separator(s) positioned between adjacent electrodes. The electrode assembly is positioned in a battery case. The battery case is then at least partially filled with the first liquid phase such that the first phase enters the active region of the electrode assembly. The case can be partially filled with the first phase so as to leave additional space available in the case. In some instances, the first liquid phase penetrates into the electrode assembly over time so as to form additional space in the case. The second phase is then positioned in the available space in the battery case. For instance, the second phase can be positioned between the electrode assembly and the walls of the case and/or the second phase can be positioned over the electrode assembly. In the case of prismatic cells, space is often available for the second phase in the corners of the cell. Wound cells are often formed by winding the electrode assembly around a mandrel and the mandrel is then removed. The space that was previously occupied by the mandrel is often available for the second phase.

Although the formation of the battery is disclosed in the context of placing the first phase in the case before the second phase, the second phase can be placed in the case before the first phase. In some instances, the positioning of the first phase and the second phase in the case can be alternated. For instance, the second phase can be positioned in the case followed by positioning of the first phase in the case followed by positioning of the second phase in the case. The electrode assembly can be positioned in the case after the first phase or the second phase is positioned in the case. For instance, the second phase can be positioned in the bottom of the case and the electrode assembly can then be positioned in the case such that the electrode assembly is positioned over the second phase.

Additional information about the formation of a cell having a second phase that includes a fire retardant is described in U.S. patent application Ser. No. 10/034,316, filed on Dec. 28, 2001, entitled "Electrolyte System and Energy Storage Device Using Same;" and in U.S. patent application Ser. No. 10/498,603, filed on Jun. 9, 2004, and entitled "Electrolyte System and Energy Storage Device;" and in International Patent Application number PCT/US02/39451, filed on Dec. 10, 2002, and entitled "Electrolyte System and Energy Storage Device Using Same;" each of which is incorporated herein in its entirety.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A battery, comprising:
   an electrode assembly including one or more anodes and one or more cathodes;
   a first liquid phase including a first fire retardant and an electrolyte, the first liquid phase being positioned in an active region of the electrode assembly; and
   a second liquid phase in contact with the first liquid phase, the second liquid phase including a second fire retardant that is different from the first fire retardant,
   wherein the electrolyte includes one or more salts dissolved in a solvent, the solvent including one or more organic solvents selected from a group consisting of: tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate (EMC), methyl propyl carbonate, ethyl propyl carbonate, diethyl carbonate (DEC), dipropyl carbonate, propylene carbonate (PC), ethylene carbonate (EC), butylene carbonate, acetonitrile, dimethyl sulfoxide, dimethyl formamide, dimethyl acetamide, γ-valerolactone, y-butyrolactone (GBL), and N-methyl-2-pyrrolidone (NMP).

2. A battery, comprising:
   an electrode assembly including one or more anodes and one or more cathodes;
   a first liquid phase including a first fire retardant and an electrolyte, the first liquid phase being positioned in an active region of the electrode assembly; and
   a second liquid phase in contact with the first liquid phase, the second liquid phase including a second fire retardant that is different from the first fire retardant,
   wherein a decomposition temperature of the first fire retardant is between 60° C. and 190° C. at 1 atm.

3. A battery, comprising:
   an electrode assembly including one or more anodes and one or more cathodes;
   a first liquid phase including a first fire retardant and an electrolyte, the first liquid phase being positioned in an active region of the electrode assembly; and
   a second liquid phase in contact with the first liquid phase, the second liquid phase including a second fire retardant that is different from the first fire retardant.
   wherein the electrolyte includes an additive selected to form a passivation layer on one or more electrodes in the electrode assembly.

4. A battery, comprising:
   an electrode assembly including one or more anodes and one or more cathodes;
   a first liquid phase including a first fire retardant and an electrolyte, the first liquid phase being positioned in an active region of the electrode assembly; and
   a second liquid phase in contact with the first liquid phase, the second liquid phase including a second fire retardant that is different from the first fire retardant,
   wherein the electrolyte includes a substituted borane.

5. A battery, comprising:
   an electrode assembly including one or more anodes and one or more cathodes;
   a first liquid phase including a first fire retardant and an electrolyte, the first liquid phase being positioned in an active region of the electrode assembly; and
   a second liquid phase in contact with the first liquid phase, the second liquid phase including a second fire retardant that is different from the first fire retardant,
   wherein the electrode assembly, the first liquid phase, and the second liquid phase are positioned in a battery case.

6. The battery of claim 5, wherein the second liquid phase concurrently contacts both the first liquid phase and the case.

7. The battery of claim 5, wherein a portion of the second liquid phase is located in the active region of the electrode assembly.

8. The battery of claim 5, wherein
   the second liquid phase directly contacts the first liquid phase but the second liquid phase and the first liquid phase are liquid-liquid phase separated from one another.

9. The battery of claim 8 wherein a portion of the first liquid phase that contacts the second liquid phase is continuous and unbroken.

10. The battery of claim 9, wherein the first liquid phase has a different chemical composition than the second liquid phase.

11. The battery of claim 10, wherein the active region is defined by a perimeter of the one or more anodes and one or more cathodes included in the electrode assembly.

12. A battery, comprising:
   an electrode assembly including one or more anodes and one or more cathodes;
   a first liquid phase including a first fire retardant and an electrolyte, the first liquid phase being positioned in an active region of the electrode assembly; and
   a second liquid phase in contact with the first liquid phase, the second liquid phase including a second fire retardant that is different from the first fire retardant,
   wherein the first liquid phase is continuous and unbroken.

* * * * *